(12) United States Patent
Arisawa et al.

(10) Patent No.: US 11,374,237 B2
(45) Date of Patent: Jun. 28, 2022

(54) FUEL CELL STACK

(71) Applicant: Toyota Jidosha Kabushiki Kaisha, Toyota (JP)

(72) Inventors: Hiroshi Arisawa, Susono (JP); Nobuaki Nonoyama, Chiryu (JP); Masahiro Katayama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 510 days.

(21) Appl. No.: 16/296,672

(22) Filed: Mar. 8, 2019

(65) Prior Publication Data
US 2019/0280311 A1 Sep. 12, 2019

(30) Foreign Application Priority Data

Mar. 12, 2018 (JP) .............................. JP2018-044721

(51) Int. Cl.
| | | |
|---|---|---|
| *H01M 8/0258* | (2016.01) | |
| *H01M 8/0267* | (2016.01) | |
| *H01M 8/04029* | (2016.01) | |
| *H01M 8/2483* | (2016.01) | |
| *H01M 8/04291* | (2016.01) | |
| *H01M 8/04007* | (2016.01) | |

(52) U.S. Cl.
CPC ....... *H01M 8/0258* (2013.01); *H01M 8/0267* (2013.01); *H01M 8/04029* (2013.01); *H01M 8/04074* (2013.01); *H01M 8/04291* (2013.01); *H01M 8/2483* (2016.02)

(58) Field of Classification Search
CPC .................................................. H01M 8/0267
See application file for complete search history.

(56) References Cited

U.S. PATENT DOCUMENTS

| | | | | |
|---|---|---|---|---|
| 9,502,722 | B2 | 11/2016 | Lee | |
| 2002/0031697 | A1* | 3/2002 | Sugita | H01M 8/0271 |
| | | | | 429/434 |
| 2006/0040159 | A1* | 2/2006 | Sato | H01M 8/0297 |
| | | | | 429/434 |
| 2012/0100450 | A1* | 4/2012 | Lee | H01M 8/0267 |
| | | | | 429/436 |

* cited by examiner

*Primary Examiner* — Maria Laios
(74) *Attorney, Agent, or Firm* — Dinsmore & Shohl LLP

(57) ABSTRACT

A fuel cell stack includes a stacked body including unit cells that are stacked and an end member arranged at an end side of the stacked body in a stacking direction of the stacked body.

8 Claims, 9 Drawing Sheets

FIRST EMBODIMENT

SECOND EMBODIMENT

SECOND EMBODIMENT

SIXTH EMBODIMENT

SEVENTH EMBODIMENT

EIGHTH EMBODIMENT

EIGHTH EMBODIMENT

FUEL CELL STACK

CROSS-REFERENCE TO RELATED APPLICATION

This application is based upon and claims the benefit of priority of the prior Japanese Patent Application No. 2018-044721, filed on Mar. 12, 2018, the entire contents of which are incorporated herein by reference.

TECHNICAL FIELD

The present disclosure relates to a fuel cell stack.

BACKGROUND

There is known a fuel cell stack in which unit cells are stacked. Such a fuel cell stack is supplied with cooling water for cooling the unit cells that increase temperature due to power generation reaction. Herein, a unit cell arranged in the center in the stacking direction of the unit cells also receives heat from the adjacent unit cells, so that heat is seldom dissipated and its temperature tends to increase. For this reason, the temperature of the cooling water is adjusted in order to cool such a unit cell that tends to increase its temperature. However, as for a unit cell arranged at an end in the stacking direction, heat dissipation is promoted and its temperature easily decreases, as compared with the unit cell arranged in the center. If the temperature of the unit cell is lowered in such a manner, it might be lower than the temperature at which the power generation reaction is activated, and dew condensation might occur in the flow path of the unit cell through which the reaction gas flows. This might degrade the power generation performance.

In U.S. Pat. No. 9,502,722, in order to suppress an excessive decrease in temperature of such a unit cell arranged at the end, an end plate arranged at an end side of the unit cells is provided with a circulation flow path portion that circulates the cooling water receiving heat from the unit cells and discharged therefrom. An inlet and an outlet of the circulation flow path portion are formed to open on an inner wall surface of a discharge hole, for discharging the cooling water from the unit cells to the outside, formed in the end plate.

In U.S. Pat. No. 9,502,722, the end plate is integrally formed with a vane that guides the cooling water discharged from the unit cells to the circulation flow path portion. Specifically, the vane protrudes from the downstream side of the discharge hole with respect to the inlet of the circulation flow path portion formed in the end plate, and is curved toward the upstream side of the discharge hole. Such a vane might not introduce a large amount of the cooling water into the circulation flow path portion, which might not sufficiently suppress a decrease in temperature of the end side of the stacked unit cells.

SUMMARY

It is an object of the present disclosure to provide a fuel cell stack that is capable of suppressing a decrease in temperature of an end side of stacked unit cells.

The above object is achieved by a fuel cell stack including: a stacked body including unit cells that are stacked; and an end member arranged at an end side of the stacked body in a stacking direction of the stacked body, wherein the stacked body includes a first discharge hole penetrating through the stacked body in the stacking direction, cooling water flowing through the first discharge hole from the stacked body to the end member, the end member includes: a second discharge hole penetrating through the stacked body in the stacking direction, communicating with the first discharge hole, and discharging the cooling water discharged from the first discharge hole to an outside of the end member; a circulation flow path portion including an inlet and an outlet that open on an inner wall surface of the second discharge hole, and the circulation flow path portion circulating a part of the cooling water flowing through the second discharge hole in the end member; a constriction portion protruding toward the inlet from a side, facing the inlet, of the inner wall surface of the second discharge hole, and the constriction portion reducing a sectional area of the second discharge hole; and a cover portion formed on a side of the inner wall surface of the second discharge hole on which the outlet opens, the cover portion formed on an upstream side of the second discharge hole with respect to the outlet, and the cover portion partially covering the second discharge hole.

The constriction portion protrudes toward the inlet of the circulation flow path portion. This ensures the flow rate of the cooling water flowing in the vicinity of the inlet of the circulation flow path portion, and ensures the flow rate of the cooling water flowing through the circulation flow path portion from the inlet. Further, the cover portion is formed on the upstream side of the second discharge hole with respect to the outlet, and partially covering the second discharge hole. This suppresses the cooling water flowing through the second discharge hole from flowing in the vicinity of the outlet of the circulation flow path portion, and suppresses the cooling water from flowing into the circulation flow path portion from the outlet. Accordingly, the flow rate of the cooling water flowing through the circulation flow path portion is ensured, and it is thus possible to suppress a decrease in temperature of the end side of the stacked unit cells.

The end member may include a cutout portion formed to enlarge a part, on the upstream side of the second discharge hole, of an opening edge of the inlet of the circulation flow path portion.

The end member may include a protruding portion formed on a side of the inner wall surface of the second discharge hole on which the inlet opens, the protruding portion may be formed on the upstream side of the second discharge hole with respect to the inlet, and the protruding portion may protrude toward the constriction portion.

The constriction portion may be formed into an inclined shape inclined to come close to the inlet from the upstream side to a downstream side of the second discharge hole.

The end member may include: a terminal plate stacked on the end side of the stacked body in the stacking direction; an insulator stacked on a side of the terminal plate opposite to the stacked body; and an end plate stacked on a side of the insulator opposite to the terminal plate.

The constriction portion may be formed at least in the end plate.

The constriction portion may be formed at least in the terminal plate.

The cover portion may be formed at least in the terminal plate.

DETAILED DESCRIPTION

First Embodiment

Figure 1:
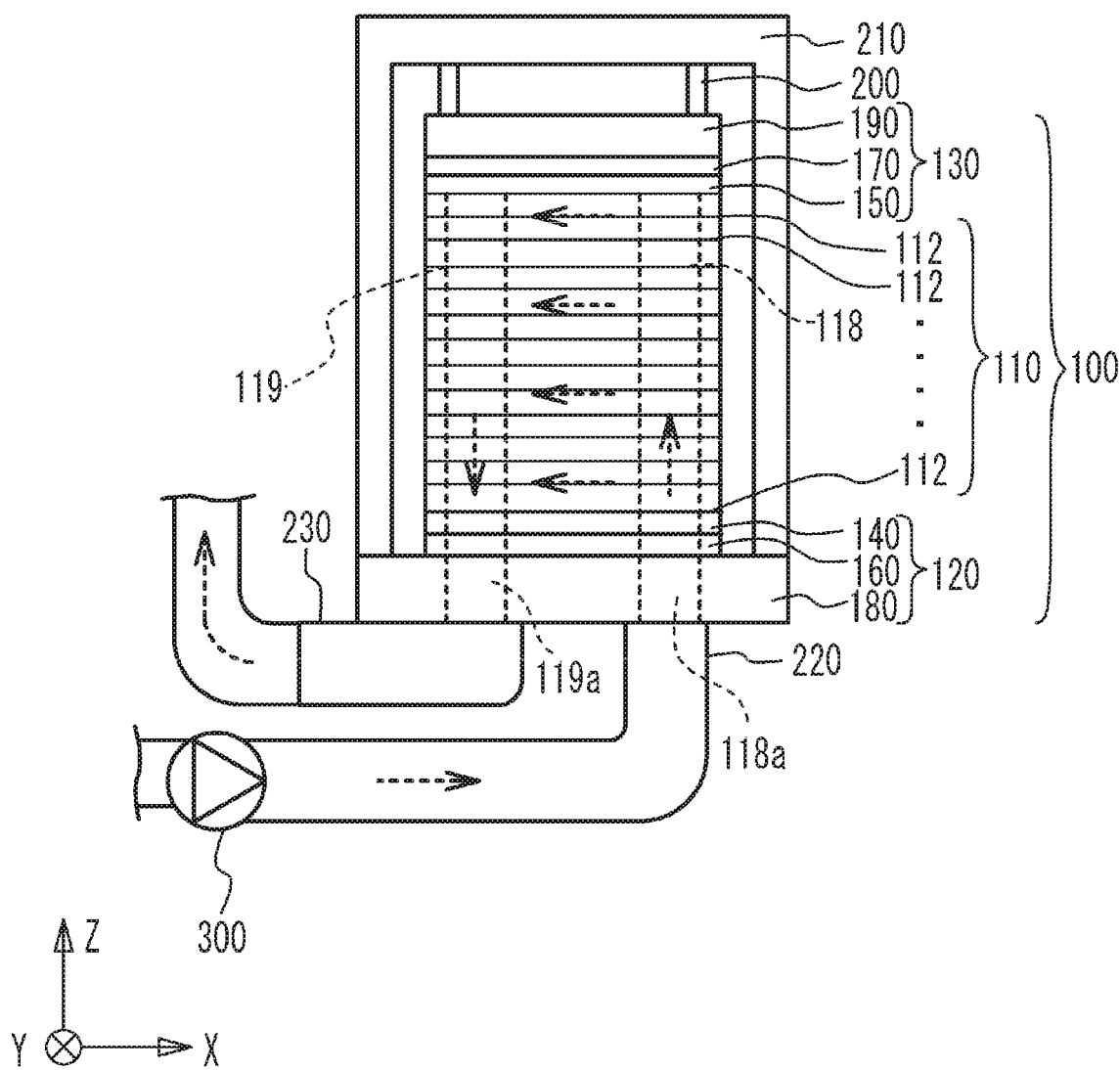
FIG. 1 is an explanatory view of a fuel cell stack according to the first embodiment.

FIG. 1 is an explanatory view of a fuel cell stack 100 according to the first embodiment. The fuel cell stack (hereinafter simply referred to as a stack) 100 includes a stacked body 110, end members 120 and 130, and a case 210. The stacked body 110 is configured by unit cells 112 stacked in the vertical direction, that is, in a Z direction illustrated in FIG. 1. The end member 120 is stacked on an end side of the stacked body 110 in the stacking direction. The end member 130 is stacked on the other end side of the stacked body 110 in the stacking direction. The end member 120 includes: a terminal plate 140 stacked on the end side of the stacked body 110 in the stacking direction; an insulator 160 stacked on a side of the terminal plate 140 opposite to the stacked body 110; and an end plate 180 stacked on a side of the insulator 160 opposite to the terminal plate 140. The end member 130 includes: a terminal plate 150 stacked on the other end side of the stacked body 110 in the stacking direction; an insulator 170 stacked on a side of the terminal plate 150 opposite to the stacked body 110; and an end plate 190 stacked on a side of the insulator 170 opposite to the terminal plate 150. Each of the terminal plates 140 and 150 is made of a metal having electrical conductivity. Each of the insulators 160 and 170 is made of a resin having an insulating property. Each of the end plates 180 and 190 is made of a plate-like metal. Each of the end plates 180 and 190 is thicker than any of the terminal plates 140 and 150, the insulators 160 and 170, and the unit cell 112.

The case 210, formed into a substantially rectangular tubular shape having a bottom portion, surrounds and protects the stacked body 110 and the like from external impact and the like. The opening end side of the case 210 is fixed to the end plate 180. Further, the end plate 190 is pushed toward the end plate 180 by screws 200. The end plate 190 is pushed toward the end plate 180 by the screws 200 in such a way, so that the stacked body 110 is fastened with certain fastening force. Also, the end plate 180 on the lower side is used to attach the stack 100 to, for example, a vehicle body.

The stacked body 110 is formed with a supply hole 118 and a discharge hole 119 penetrating therethrough in the stacking direction. The unit cell 112 is formed with a through hole penetrating therethrough in the thickness direction. The unit cells 112 are stacked such that the through holes thereof overlap one another, which defines the supply hole 118. The same applies to the discharge hole 119. Further, the end member 120 is formed with a supply hole 118a and a discharge hole 119a penetrating therethrough in the stacking direction. A through hole is formed in each of the terminal plate 140, the insulator 160, and the end plate 180 so as to penetrate therethrough in the thickness direction. These through holes are stacked to overlap one other, which defines the supply hole 118a. The same also applies to the discharge hole 119a. The supply holes 118 and 118a are formed on the same axis and communicate with each other. Also, the discharge holes 119 and 119a are formed on the same axis and communicate with each other. The supply holes 118 and 118a are also referred to as a cooling water supply manifold. The discharge holes 119 and 119a are referred to as a cooling water discharge manifold.

The end plate 180 is connected with a supply pipe 220 and a discharge pipe 230 respectively communicating with the supply hole 118a and the discharge hole 119a. Cooling water is supplied from a circulation pump 300 to the stack 100 through the supply pipe 220. The cooling water supplied to the stack 100 flows through the supply holes 118a and 118, and then flows among the unit cells 112. The cooling water flowing among the unit cells 112 is discharged from the discharge hole 119a outside the stack 100 through the discharge hole 119. The cooling water discharged from the stack 100 is introduced into a radiator (not illustrated) through the discharge pipe 230 to promote heat dissipation, and then is supplied to the stack 100 by the circulation pump 300 again. Arrows in FIG. 1 indicate a flow direction of the cooling water.

Each unit cell 112 includes a membrane-electrode-gas diffusion layer assembly (hereinafter referred to as a MEGA), an insulating member supporting the MEGA, and a pair of separators sandwiching the MEGA and the insulating member. The MEGA includes an electrolyte membrane, catalyst layers respectively formed on respective sides of the electrolyte membrane, and a pair of gas diffusion layers joined respectively to the catalyst layers. The cooling water flows between a separator of one of the adjacent unit cells 112 and a separator of the other.

Additionally, the stacked body 110 and the end member 120 are formed with an anode gas supply manifold and a cathode gas supply manifold that penetrate therethrough in the stacking direction and respectively supply the anode gas and the cathode gas to the stack 100. Further, the stacked body 110 and the end member 120 are formed with an anode gas discharge manifold and a cathode gas discharge manifold that penetrate therethrough in the stacking direction and respectively discharge the anode gas and the cathode gas from the stack 100. The anode gas, flowing from the anode gas supply manifold to the anode gas discharge manifold, and the cathode gas, flowing from the cathode gas supply manifold to the cathode gas discharge manifold, flow through the unit cells 112 so as not to join together. The end plate 180 is connected with a pipe for supplying the anode gas to the anode gas supply manifold, a pipe for supplying the cathode gas to the cathode gas supply manifold, a pipe for discharging the anode gas from the anode gas discharge manifold, and a pipe for discharging the cathode gas from the cathode gas discharge manifold.

Figure 2:
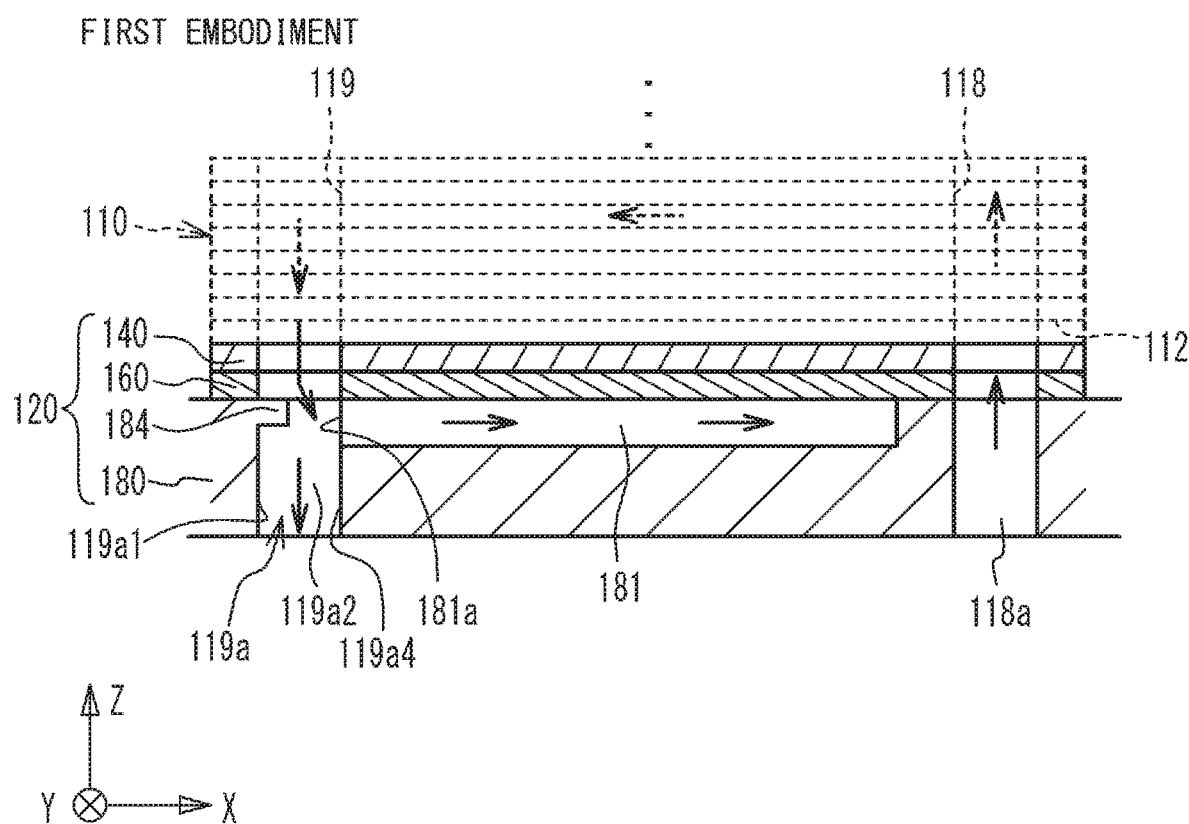
FIG. 2 is a cross-sectional view of an end member.
Figure 3:
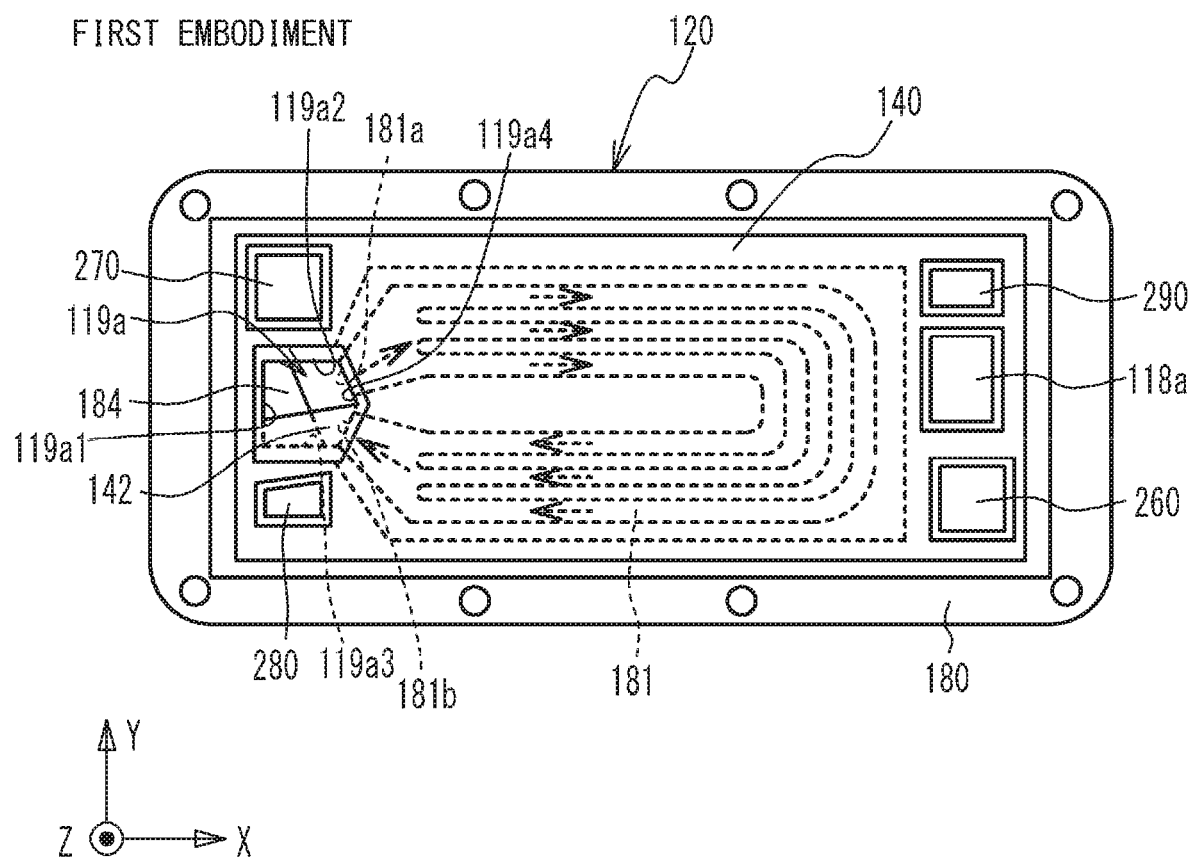
FIG. 3 is a view of the end member when viewed from a stacked body.

Next, the end member 120 will be described in detail. FIG. 2 is a cross-sectional view of the end member 120. Dotted lines in FIG. 2 illustrate a part of the stacked body 110 stacked on the end member 120. Further, arrows in FIG. 2 indicate the flow direction of the cooling water. FIG. 3 is a view of the end member 120 when viewed from the stacked body 110. As illustrated in FIG. 3, the end member 120 has a substantially rectangular shape having the longitudinal direction as the X direction and the short direction as the Y direction. The same applies to the terminal plate 140, the insulator 160, and the end plate 180 included in the end member 120. Further, the end plate 180 has an outer shape larger than each outer shape of the terminal plate 140 and the insulator 160.

As illustrated in FIG. 3, the supply hole 118a through which the cooling water flows is provided near one of two short sides opposite to each other of the end member 120, and the discharge hole 119a is provided near the other of the two short sides opposite to each other of the end member 120. Likewise, the supply hole 118, not illustrated, is provided near one of two short sides opposite to each other of the unit cell 112, and the discharge hole 119 is provided near the other of the two short sides opposite to each other of the unit cell 112. In addition, holes 260 and 290 sandwiching the supply hole 118a are formed near one of the two short sides opposite to each other of the end member 120. The hole 260 defines a part of the cathode gas supply manifold described above. The hole 290 defines a part of the anode gas discharge manifold. Holes 270 and 280 sandwiching the discharge hole 119a are formed near the other of the two short sides opposite to each other of the end member 120. The hole 270 defines a part of the cathode gas discharge manifold. The hole 280 defines a part of the anode gas supply manifold. FIG. 3 illustrates seal members not represented with reference numerals, arranged between the terminal plate 140 and the stacked body 110, and surrounding each periphery of the manifolds. In addition, positions, number, and sizes of these manifolds are not limited to these.

As illustrated in FIGS. 2 and 3, an inner wall surface of the discharge hole 119a includes inner surfaces 119a1, 119a2, 119a3, and 119a4 that are continuous in the peripheral direction. The inner surfaces 119a2 and 119a3 facing each other and spaced apart from each other in the Y direction are substantially parallel to each other. The inner surfaces 119a1 and 119a4 face each other and are spaced apart from each other in the X direction. The inner surface 119a4, not parallel to the inner surface 119a1, includes two planes that intersect each other at angles less than 180 degrees on the center side of the discharge hole 119a when viewed in the Z direction. An inlet 181a described later opens on one of the two planes of the inner surface 119a4, and an outlet 181b described later opens on the other thereof. In FIG. 3, a cover portion 142 of the terminal plate 140 covers a part of the discharge hole 119a, specifically, the inner surface 119a3 side of the discharge hole 119a.

The end plate 180 is formed with a circulation flow path portion 181 through which the cooling water circulates. The circulation flow path portion 181 is formed into a groove shape on the surface of the end plate 180 near the insulator 160. The inlet 181a and the outlet 181b of the circulation flow path portion 181 open on one and the other of the two planes of the above-described inner surface 119a4, respectively. The inlet 181a and the outlet 181b, positioned in the same plane including the X direction and the Y direction, are adjacent to each other, in other words, their height positions in the Z direction are the same. A part of the cooling water flowing through the discharge hole 119a is introduced into the circulation flow path portion 181 from the inlet 181a. The cooling water introduced into the circulation flow path portion 181 flows and circulates in the end member 120 on the same plane including the X direction and the Y direction, and then is discharged from the outlet 181b. Specifically, the circulation flow path portion 181 extends from the discharge hole 119a along one of the two long sides of the end plate 180, turns near the supply hole 118a, and extend to the discharge hole 119a along the other thereof again.

Herein, the cooling water flowing through the discharge hole 119a has flowed through the unit cells 112 and has heated by receiving heat therefrom. In contrast, the cooling water flowing through the supply hole 118a has promoted heat dissipation in the radiator as described above and has cooled. Therefore, the temperature of the cooling water flowing through the discharge hole 119a is higher than that of the cooling water flowing through the supply hole 118a. A part of the high-temperature cooling water flowing through the discharge hole 119a flows through the circulation flow path portion 181 in such a manner, so that heat is transmitted via the insulator 160 and the terminal plate 140 to the end of the stacked body 110 on the end member 120 side. This suppresses an excessive decrease in temperature at the end of the stacked body 110 on the end member 120 side, and suppresses at least the deterioration of the power generation performance of the unit cell 112 arranged closest to the end member 120.

As illustrated in FIGS. 2 and 3, the end plate 180 is formed with a constriction portion 184 on the inner surface 119a1 facing the inlet 181a formed on the inner wall surface of the discharge hole 119a. As illustrated in FIG. 3, the terminal plate 140 is formed with the cover portion 142 for covering the inner surface 119a3 and a plane of the inner surface 119a4 on which the outlet 181b of the discharge hole 119a opens. Although not illustrated in FIG. 2, the cover portion 142 is positioned on the upstream side of the discharge hole 119a with respect to the constriction portion 184.

The constriction portion 184 protrudes from the inner surface 119a1 of the discharge hole 119a toward the inlet 181a. Therefore, the constriction portion 184 reduces the cross-sectional area of the discharge hole 119a toward the inlet 181a. Accordingly, the cooling water further flows near the inlet 181a in comparison with a case of not providing such a constriction portion 184. It is thus possible to introduce a large amount of the cooling water into the inlet 181a, and to ensure the flow rate of the cooling water flowing through the circulation flow path portion 181. Further, as illustrated in FIG. 3, an end of the constriction portion 184 near the inlet 181a protrudes toward the plane of the inside surface 119a4 on which the inlet 181a is formed, when viewed in the axial direction of the discharge hole 119a, that is, in the Z direction. It is therefore possible to guide a further large amount of the cooling water to the inlet 181a.

The cover portion 142 is formed on the upstream side of the discharge hole 119a with respect to the outlet 181b so as to overlap the outlet 181b when viewed in the axial direction of the discharge hole 119a. This suppresses the cooling water flowing through the discharge hole 119a from flowing near the outlet 181b, and suppresses the cooling water from being introduced from the outlet 181b into the circulation flow path portion 181. This ensures the flow rate of the cooling water discharged from the circulation flow path portion 181 to the discharge hole 119a through the outlet 181b, in other words, this ensures the flow rate of the cooling water flowing through the circulation flow path portion 181.

The cover portion 142 and the constriction portion 184 ensure the flow rate of the cooling water flowing through the circulation flow path portion 181 in the above manner, which suppresses an excessive decrease in temperature of the unit cell 112 that is stacked on the end member 120 and is arranged at the end of the stacked body 110.

Second Embodiment

Figure 4A:
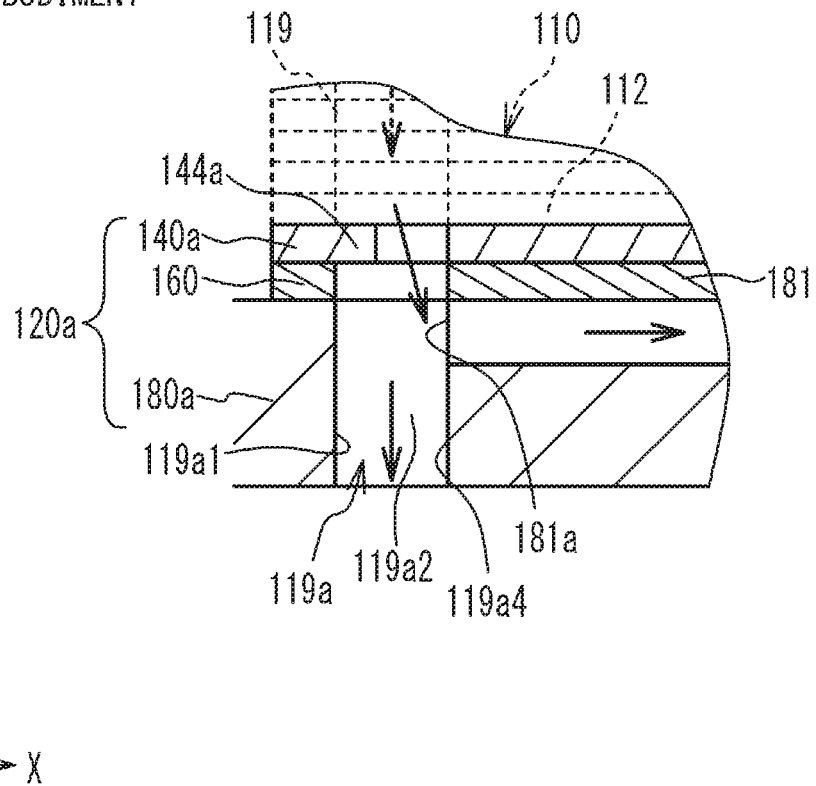
FIG. 4A is a partially cross-sectional view of a fuel cell stack according to the second embodiment.
Figure 4B:
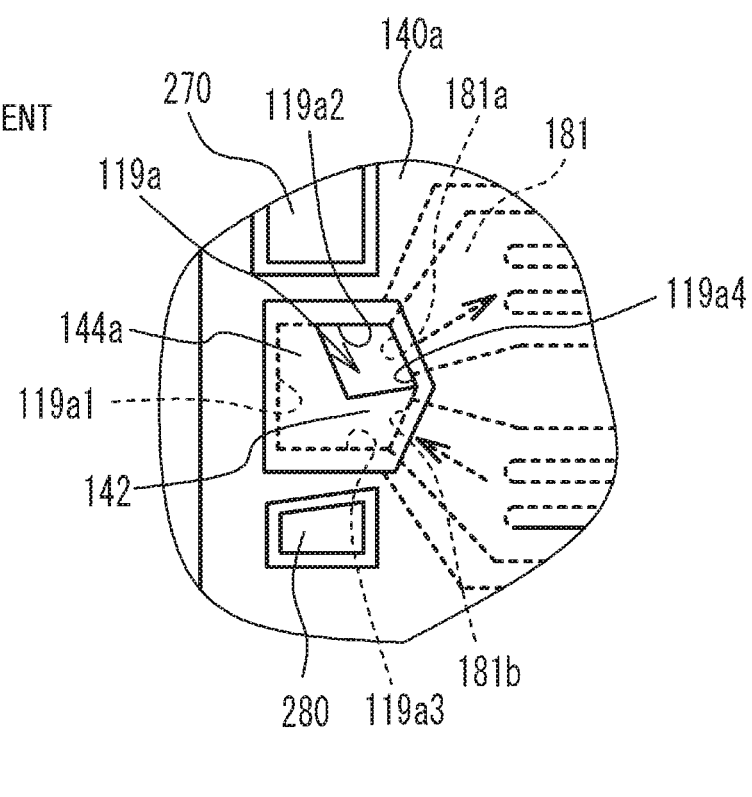
FIG. 4B is a view illustrating a part of an end member of the fuel cell stack according to the second embodiment when viewed from the stacked body.

A fuel cell stack according to the second embodiment will be described. Additionally, in the following embodiments, the same reference numerals are given to the same components as those in the above-described embodiment, and duplicated description is omitted. FIG. 4A is a partially cross-sectional view of the fuel cell stack according to the second embodiment. FIG. 4B is a view illustrating a part of an end member 120a of the fuel cell stack according to the second embodiment when viewed from the stacked body 110.

The end member 120a in the second embodiment includes a terminal plate 140a, the insulator 160, and an end plate 180a. Unlike the end plate 180 in the first embodiment, the end plate 180a in the second embodiment does not include the constriction portion 184. Further, unlike the terminal plate 140 in the first embodiment, the terminal plate 140a in the second embodiment is integrally formed with a constriction portion 144a in addition to the cover portion 142. The constriction portion 144a also protrudes from the inner surface 119a1 toward the inlet 181a. Further, as illustrated in FIG. 4B, an end of the constriction portion 144a near the inlet 181a is also substantially parallel to the plane on which the inlet 181a is formed. The constriction portion 144a is positioned on the upstream side of the discharge hole 119a with respect to the inlet 181a. The height position of the constriction portion 144a in the Z direction is the same as the cover portion 142. The cover portion 142 and the constriction portion 144a open only the vicinity of the inlet 181a of the discharge hole 119a and cover the other thereof. Accordingly, the cover portion 142 and the constriction portion 144a reduce the cross-sectional area of the discharge hole 119a in the vicinity of the inlet 181a, thereby ensuring the flow rate of the cooling water in the vicinity of the inlet 181a. This ensures the flow rate of the cooling water flowing through the circulation flow path portion 181.

Additionally, in the second embodiment, by devising the shape of the terminal plate 140a, the flow rate of the cooling water flowing through the circulation flow path portion 181 is ensured without devising the shape of the end plate 180a. Therefore, as compared with the end plate 180 in the first embodiment, it is easy to produce the end plate 180a in the second embodiment, and its production cost is reduced.

Third Embodiment

Figure 5A:
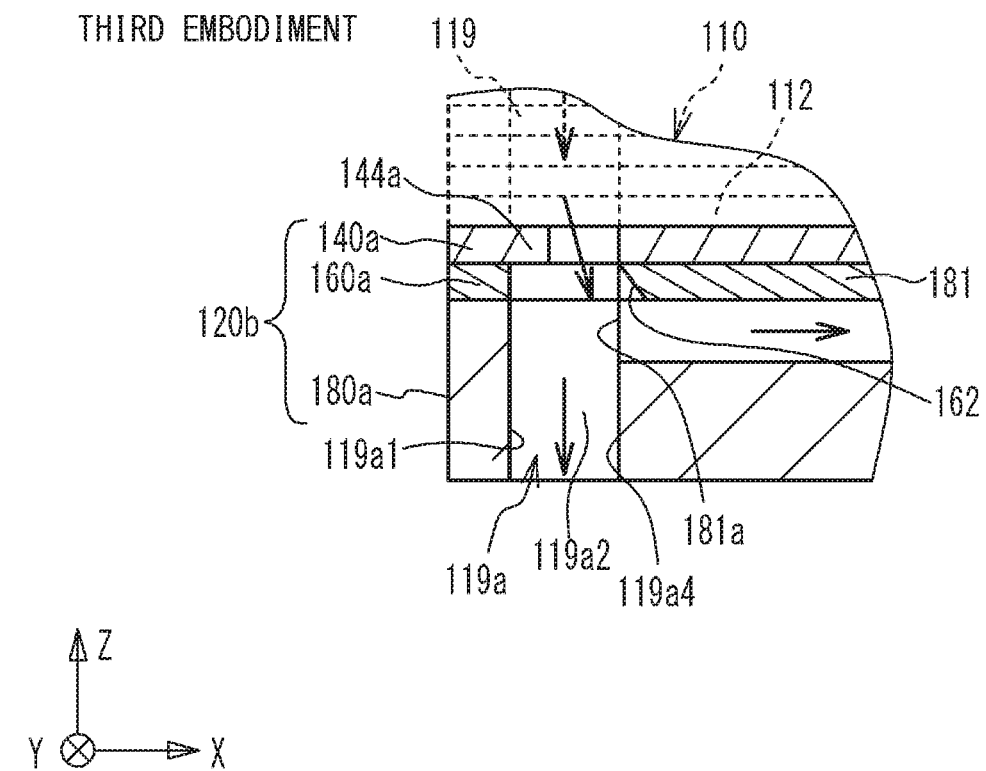
FIG. 5A is a partially cross-sectional view of a fuel cell stack according to the third embodiment.
Figure 5B:
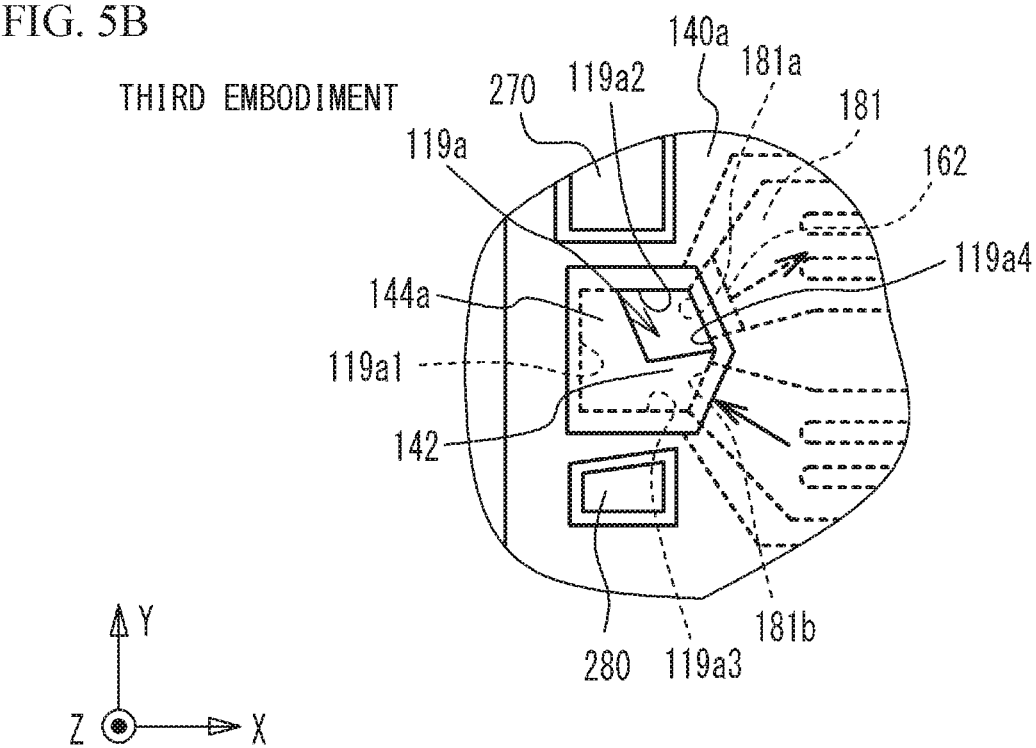
FIG. 5B is a view illustrating a part of an end member of the fuel cell stack according to the third embodiment when viewed from the stacked body.

A fuel cell stack according to the third embodiment will be described. FIG. 5A is a partially cross-sectional view of the fuel cell stack according to the third embodiment. FIG. 5B is a view illustrating a part of an end member 120b of the fuel cell stack according to the third embodiment when viewed from the stacked body 110.

The end member 120b in the third embodiment includes the terminal plate 140a, an insulator 160a, and the end plate 180a. Unlike the insulator 160 in the first and second embodiments, the insulator 160a in the third embodiment includes a cutout portion 162 formed near the inlet 181a of the end plate 180a. As illustrated in FIGS. 5A and 5B, the cutout portion 162 is formed to cut a part, on the upstream side of the discharge hole 119a, of the opening edge of the inlet 181a. A dotted line in FIG. 5B illustrates the cutout portion 162. The cutout portion 162 is formed to enlarge the opening area of the inlet 181a. As illustrated in FIG. 5A, a surface of the cutout portion 162 is inclined obliquely in the direction in which the cooling water flows into the inlet 181a from the upstream side to the downstream side of the discharge hole 119a. It is therefore possible to guide a further large amount of the cooling water into the circulation flow path portion 181 by the cutout portion 162. In addition, the cutout portion 162 is inclined obliquely not to obstruct the flow of the cooling water flowing from the discharge hole 119a to the inlet 181a, thereby suppressing the pressure loss of the cooling water. This suppresses the pressure loss of the cooling water, which ensures the flow rate of the cooling water flowing through the circulation flow path portion 181.

Fourth Embodiment

Figure 6A:
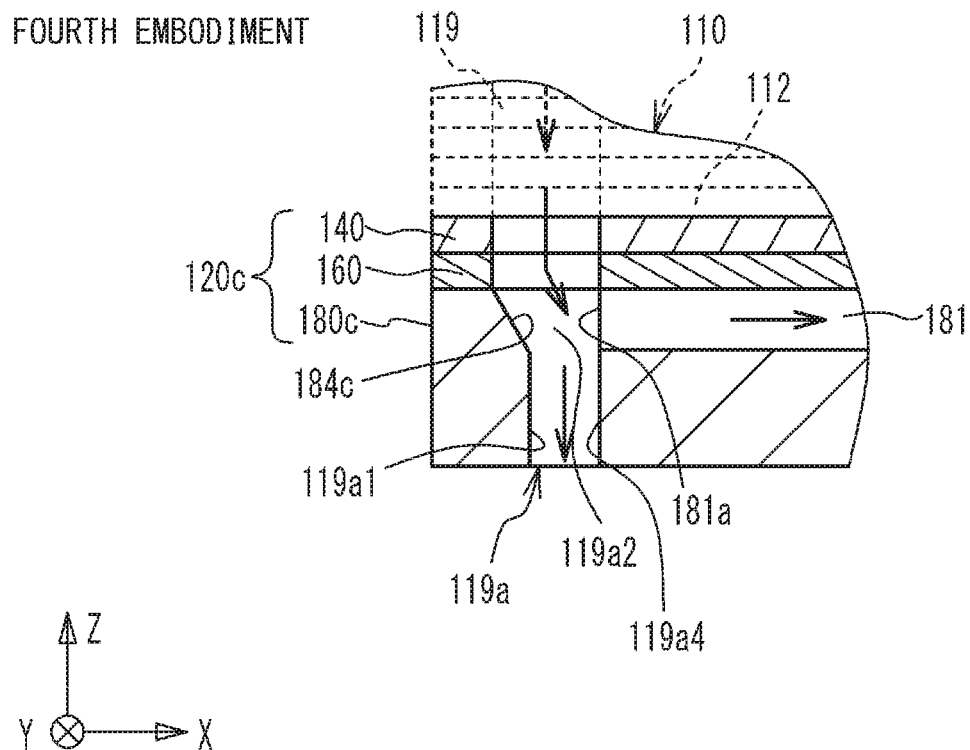
FIG. 6A is a partially cross-sectional view of an end member of a fuel cell stack according to the fourth embodiment.

A fuel cell stack according to the fourth embodiment will be described. FIG. 6A is a partially cross-sectional view of an end member 120c of the fuel cell stack according to the fourth embodiment. The end member 120c in the fourth embodiment includes the terminal plate 140, the insulator 160, and an end plate 180c. The end plate 180c in the fourth embodiment is formed with a constriction portion 184c instead of the constriction portion 184. The constriction portion 184c has an inclined shape protruding obliquely so as to come close to the inlet 181a from the upstream side to the downstream side of the discharge hole 119a. It is thus possible to guide the cooling water to the inlet 181a and to suppress an increase in pressure loss of the cooling water. Further, the constriction portion 184c reduces the cross-sectional area of the discharge hole 119a in the vicinity of the inlet 181a, thereby ensuring the flow rate of the cooling water flowing in the vicinity of the inlet 181a. Accordingly, like the above-described embodiment, the flow rate of the cooling water flowing into the inlet 181a is ensured by a differential pressure between the inlet 181a and the outlet 181b, thereby ensuring the flow rate of the cooling water flowing through the circulation flow path portion 181.

Fifth Embodiment

Figure 6B:
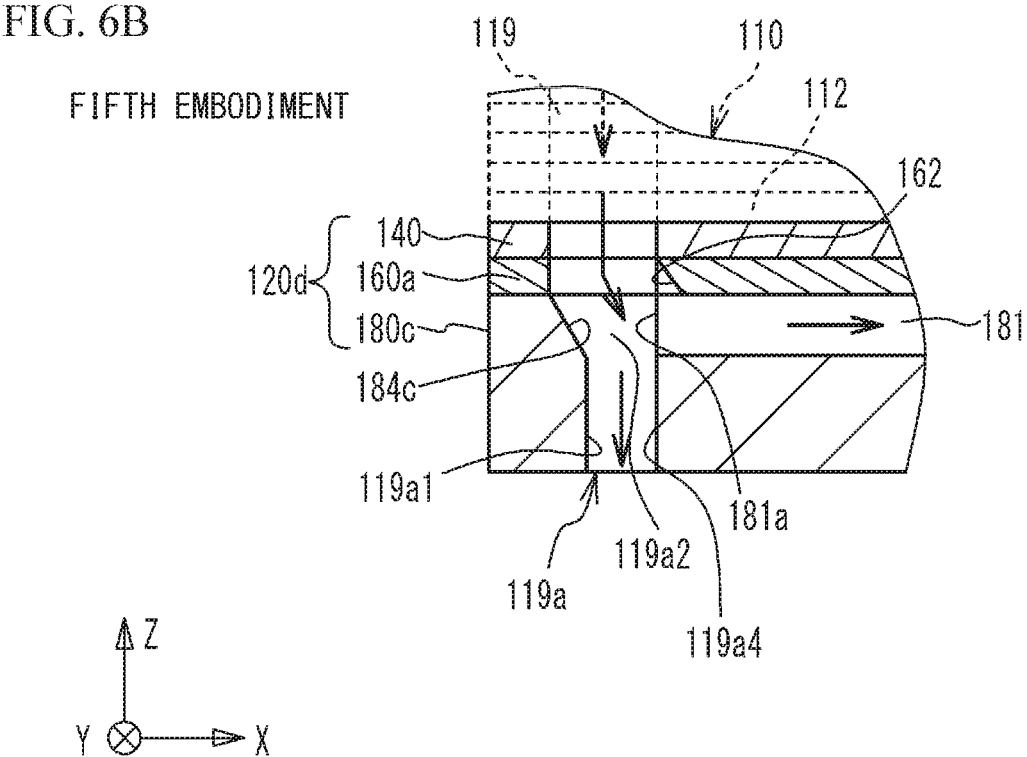
FIG. 6B is a partially cross-sectional view of an end member of a fuel cell stack according to the fifth embodiment.

A fuel cell stack according to the fifth embodiment will be described. FIG. 6B is a partially cross-sectional view of an end member 120d of the fuel cell stack according to the fifth embodiment. The end member 120d in the fifth embodiment includes the terminal plate 140, the insulator 160a, and the end plate 180c. In the fifth embodiment, the cutout portion 162 of an insulator 160c and the constriction portion 184c of the end plate 180c guide the cooling water to the inlet 181a while suppressing an increase in the pressure loss. This ensures the flow rate of the cooling water flowing through the circulation flow path portion 181. The surface of the cutout portion 162 and the surface of the constriction portion 184c face each other and are arranged substantially in parallel to each other.

Sixth Embodiment

Figure 7A:
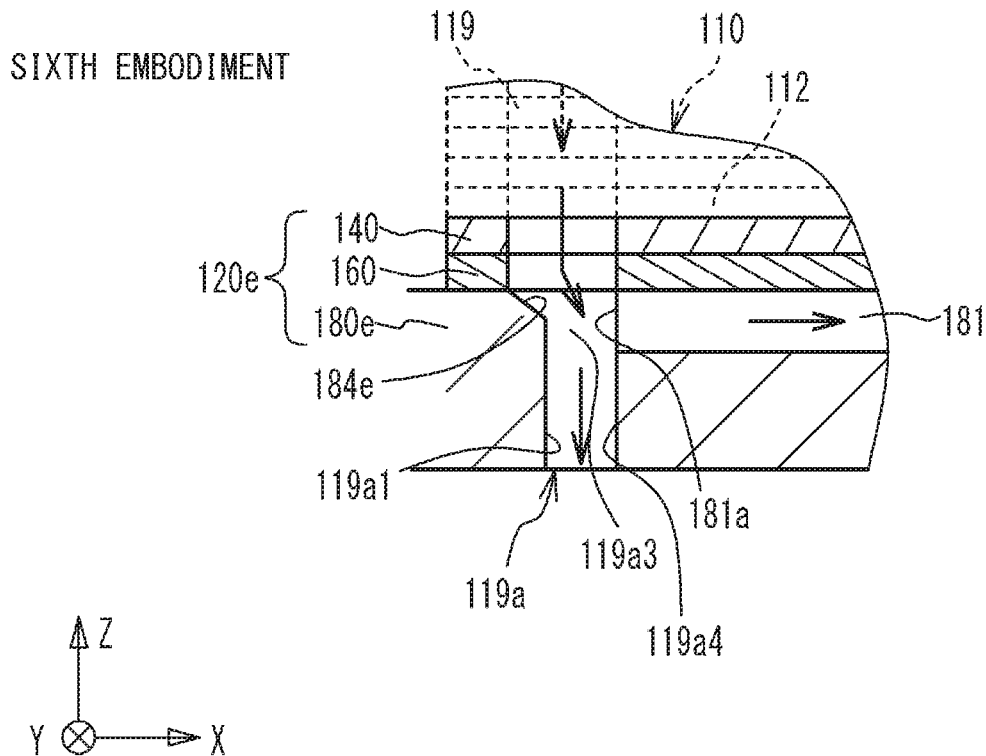
FIG. 7A is a partially cross-sectional view of an end member of a fuel cell stack according to the sixth embodiment.

A fuel cell stack according to the six embodiment will be described. FIG. 7A is a partially cross-sectional view of an end member 120e of the fuel cell stack according to the sixth embodiment. The end member 120e according to the sixth embodiment includes the terminal plate 140, the insulator 160, and an end plate 180e. Unlike the end plate 180c in the fifth embodiment, the end plate 180e in the sixth embodiment is not formed with the cutout portion 162, and is formed with a constriction portion 184e instead of the constriction portion 184c. An inclination angle of the constriction portion 184e is close to the horizontal angle, as compared with the constriction portion 184c. Even such a constriction portion 184e guides the cooling water to the inlet 181a while suppressing the pressure loss, thereby ensuring the flow rate of the cooling water flowing through the circulation flow path portion 181.

Seventh Embodiment

Figure 7B:
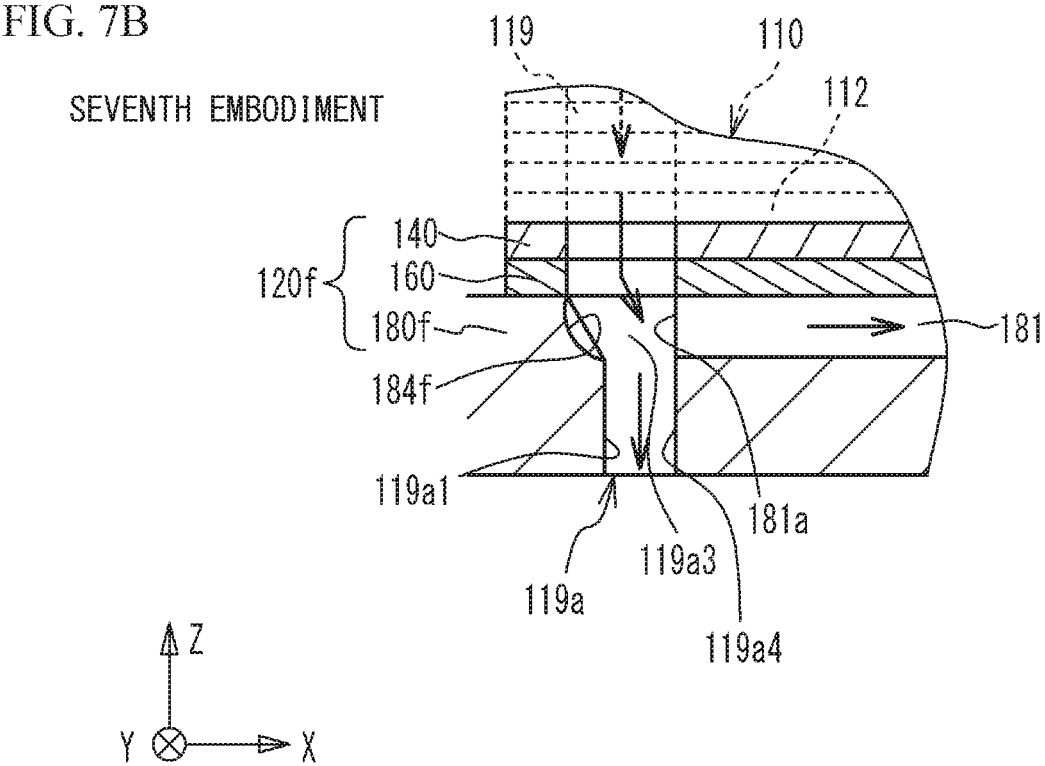
FIG. 7B is a partially cross-sectional view of an end member of a fuel cell stack according to the seventh embodiment.

A fuel cell stack according to the seventh embodiment will be described. FIG. 7B is a partially cross-sectional view of an end member 120f of the fuel cell stack according to the seventh embodiment. The end member 120f in the seventh embodiment includes the terminal plate 140, the insulator 160, and an end plate 180f. Unlike the end plate 180e in the sixth embodiment, the end plate 180f in the seventh embodiment is formed with a constriction portion 184f instead of the constriction portion 184e. The constriction portion 184f is formed to have a surface facing the inlet 181a and is curved in a spherical shape. In other words, the constriction portion 184f is curved in a concave shape. The constriction portion 184f guides the cooling water to the inlet 181a while suppressing an increase in the pressure loss of the cooling water.

Eighth Embodiment

Figure 8A:
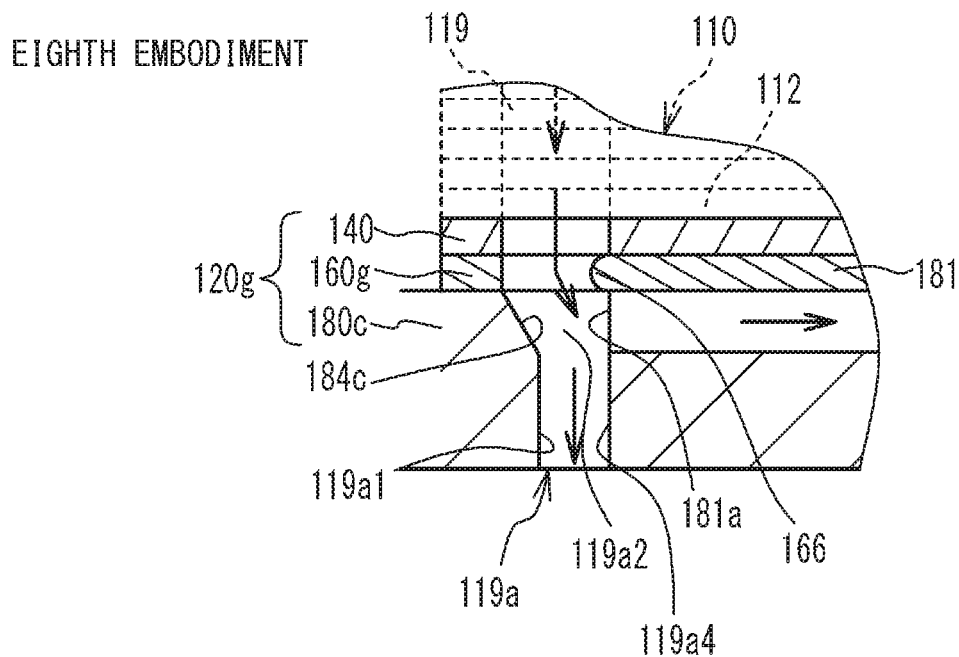
FIG. 8A is a partially cross-sectional view of an end member of a fuel cell stack according to the eighth embodiment.
Figure 8B:
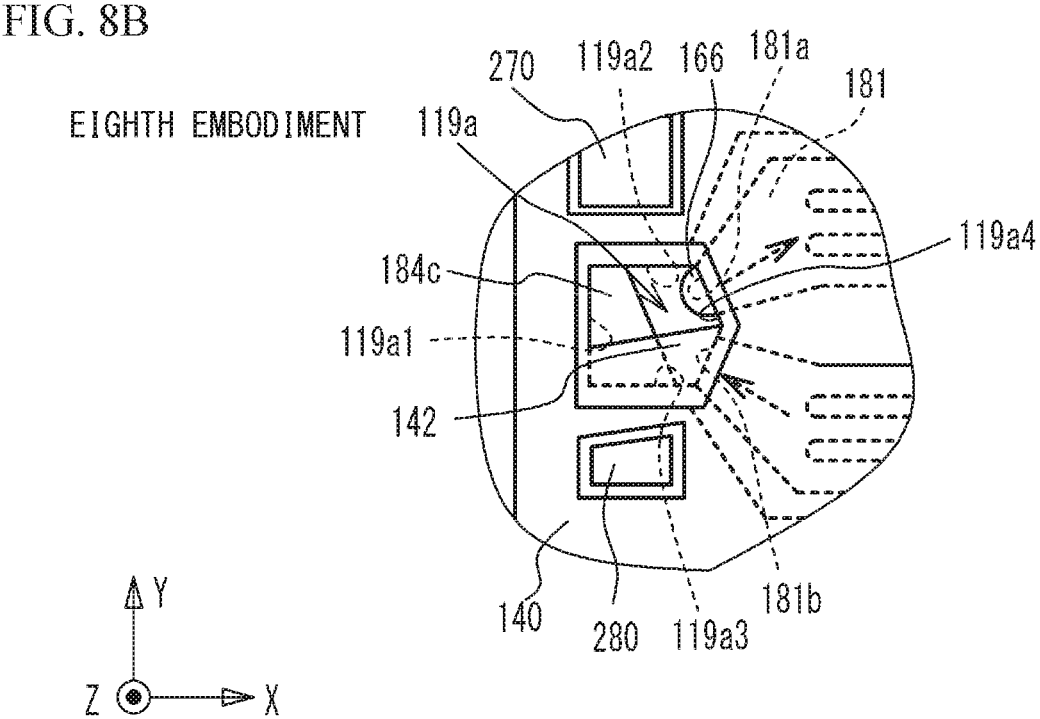
FIG. 8B is a view illustrating a part of the end member of the fuel cell stack according to the eighth embodiment when viewed from the stacked body.

A fuel cell stack according to the eighth embodiment will be described. FIG. 8A is a partially cross-sectional view of an end member 120g of the fuel cell stack according to the eighth embodiment. FIG. 8B is a view illustrating a part of the end member 120g of the fuel cell stack according to the eighth embodiment when viewed from the stacked body 110. The end member 120g in the eighth embodiment includes the terminal plate 140, an insulator 160g, and the end plate 180c. Unlike the insulator 160 in the seventh embodiment and the like, the insulator 160g in the eighth embodiment includes an protruding portion 166. An end of the protruding portion 166 is formed into a spherical shape, but it is not limited thereto. The protruding portion 166, positioned on the upstream side of the discharge hole 119a with respect to the inlet 181a, protrudes toward the inner surface 119a1 from the inner surface 119a4 of the discharge hole 119a on which the inlet 181a opens. In other words, the protruding portion 166 protrudes toward the constriction portion 184c. This reduces the cross-sectional area of the discharge hole 119a between the protruding portion 166 and the constriction portion 184c. It is thus possible to guide the cooling water to the inlet 181a while ensuring the flow rate of the cooling water flowing in the vicinity of the inlet 181a, which ensures the flow rate of the cooling water flowing through the circulation flow path portion 181.

Figure 9:
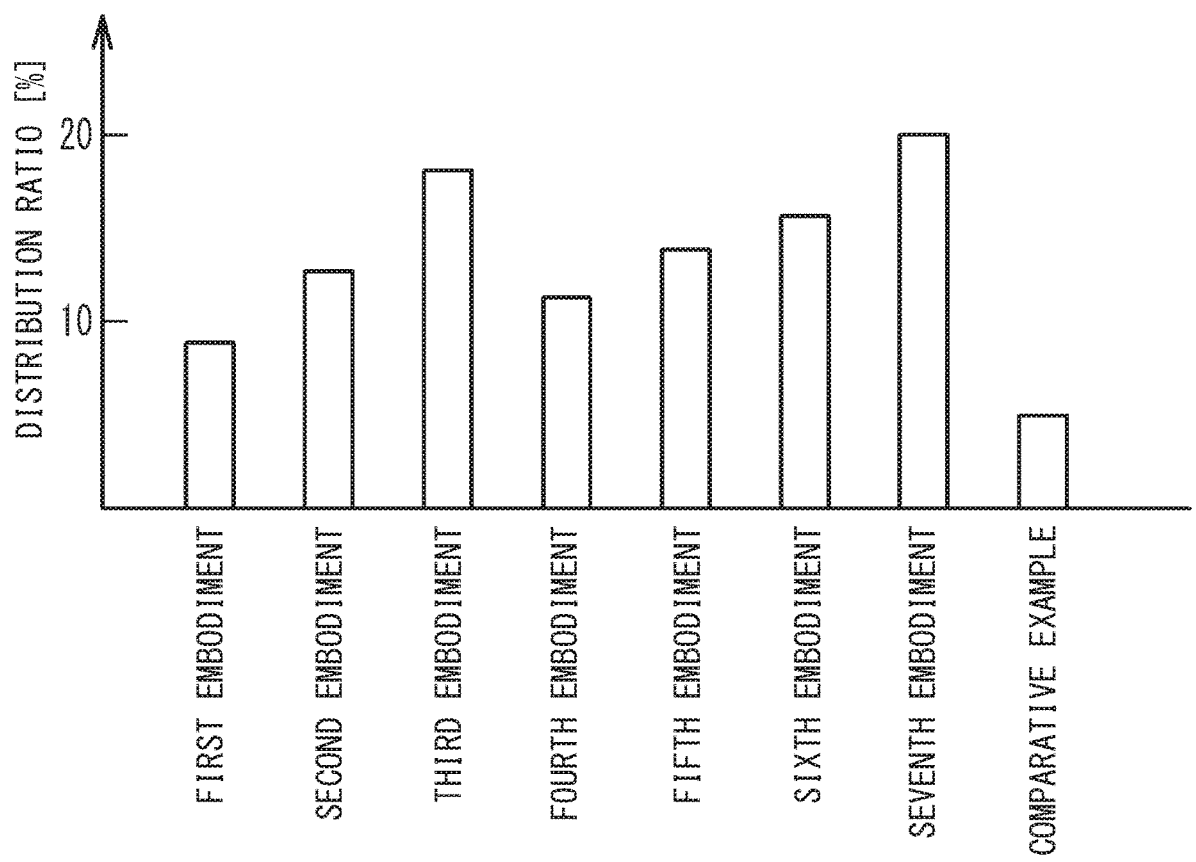
FIG. 9 is a graph illustrating distribution ratios of cooling water according to the first to seventh embodiments and a comparative example.

Next, a description will be given of a distribution ratio of the cooling water in each embodiment described above. FIG. 9 is a graph illustrating distribution ratios of the cooling water according to the first to seventh embodiments and a comparative example. The distribution ratio is the ratio of the cooling water flowing through the circulation flow path portion 181 to the cooling water flowing through the discharge hole 119a. The greater the distribution ratio is, the greater the flow rate of the cooling water flowing through the circulation flow path portion 181 is. Herein, like the configuration described in U.S. Pat. No. 9,502,722 described above, the comparative example includes a vane integrally formed in the end plate. The comparative example, the first embodiment, the fourth embodiment, the second embodiment, the fifth embodiment, the sixth embodiment, the third embodiment, and the seventh embodiment are in ascending order of the distribution ratio. In any of the embodiments, the distribution ratio is ensured as compared to the comparative example.

The reason why the distribution ratio of the first embodiment is greater than that of the comparative example is considered as follows. In the first embodiment, the cover portion 142 and the constriction portion 184 ensure the flow rate of the cooling water flowing into the inlet 181a. In contrast, in the comparative example, there is not such a configuration for introducing a further large amount of the cooling water into the inlet.

The reason why the distribution ratio of the fourth embodiment is greater than that of the first embodiment is that the amount of the cooling water guided to the inlet 181a is conceivably larger by the inclined constriction portion 184c in the fourth embodiment than by the constriction portion 184 in the first embodiment. The reason why the distribution ratio of the second embodiment is larger than that of the fourth embodiment is considered as follows. The cover portion 142 and the constriction portion 144a in the second embodiment generate a differential pressure between the vicinity of the inlet 181a and the vicinity of the outlet 181b on the upstream side of the discharge hole 119a with respect to the inlet 181a and the outlet 181b, thereby introducing a further large amount of the cooling water into the inlet 181a. The reason why the distribution ratio of the fifth embodiment is larger than that of the fourth embodiment is considered as follows. The cutout portion 162 is not formed in the fourth embodiment but in the fifth embodiment, whereby a further large amount of the cooling water is guided to the inlet 181a by the constriction portion 184c and the cutout portion 162 in the fifth embodiment. The reason why the distribution ratio of the sixth embodiment is larger than that of the fifth embodiment is considered as follows. In the sixth embodiment, the cutout portion 162 is not formed but the inclination angle of the constriction portion 184e is closer to the horizontal angle, so that a further large amount of the cooling water flows into the inlet 181a. The reason why the distribution ratio of the third embodiment is larger than that of the sixth embodiment is considered as follows. The cover portion 142 and the constriction portion 144a generate the differential pressure on the upstream side of the discharge hole 119a with respect to the inlet 181a and the outlet 181b, and the opening edge of the inlet 181a on the upstream side of the discharge hole 119a is cut out by the cutout portion 162, so that a further large amount of the cooling water flows into the inlet 181a. The reason why the distribution ratio of the seventh embodiment is larger than that of the sixth embodiment is that the constriction portion 184f curved in a concave shape conceivably guides a further large amount of the cooling water to the inlet 181a.

Moreover, like the above-described embodiments, the constriction portion, the cover portion, and the protruding portion for ensuring the flow rate of the cooling water in the circulation flow path portion may be provided in any of the end plate, the insulator, and the terminal plate, in consideration of the pressure loss of the cooling water and the production cost. This improves the degree of freedom in the design of the structure for ensuring the flow rate of the cooling water in the circulation flow path portion.

In the above-described embodiments, the circulation flow path portion 181 is formed into a groove shape on the surface of the end plate near the insulator, but is not limited thereto. For example, the circulation flow path portion may be formed within the end plate between the surface thereof near the insulator and the other surface opposite thereto. Further, the circulation flow path portion may be formed in the insulator or the terminal plate. For example, in a case where the circulation flow path portion is formed in the insulator, the circulation flow path portion may be formed into a groove shape on one surface near the terminal plate side, on the other surface near the end plate side, or within the insulator between the surface near the terminal plate and the surface near the end plate. In the case where the circulation flow path portion is formed in the terminal plate, the circulation flow path portion may be formed into a groove shape on one surface near the stacked body 110, on the other surface near the insulator, or within the terminal plate between the surface near the stacked body 110 and the other surface near the insulator. The circulation flow path portion may be formed by combining a flow path portion formed into a groove shape on the surface of the end plate near the insulator and a flow path portion formed into a groove shape on the insulator near the end plate. The circulation flow path portion may be formed by combining a flow path portion formed into a groove shape on the surface of the insulator near the terminal plate and a flow path portion formed into a groove shape on the surface of the terminal plate near the insulator.

In the above-described embodiments, the constriction portion 184, the constriction portion 184*c*, and the like are formed in the end plate, but they are not limited thereto. The constriction portion may be formed in, for example, the insulator or the terminal plate. The constriction portion may be formed, for example, only in the insulator, only in the terminal plate, over the insulator and the end plate, over the terminal plate and the insulator, or over the terminal plate, the insulator, and the end plate.

In the above-described embodiments, the cover portion 142 is formed in the terminal plate 140, but it is not limited thereto. For example, the cover portion may be formed in the insulator, in the end plate, or over the insulator and the end plate, as long as the cover portion is formed on the upstream side of the discharge hole 119*a* with respect to the outlet of the circulation flow path portion.

As illustrated in FIG. 1, the stack 100 is arranged in a state where the stacking direction of the unit cells 112 is the gravity direction, but is not limited to this. For example, the stack 100 may be arranged in a state where the stacking direction of the unit cells 112 is the horizontal direction.

Although some embodiments of the present disclosure have been described in detail, the present disclosure is not limited to the specific embodiments but may be varied or changed within the scope of the present disclosure as claimed.

What is claimed is:
1. A fuel cell stack comprising:
   a stacked body including unit cells that are stacked; and
   an end member arranged at an end side of the stacked body in a stacking direction of the stacked body,
   wherein
   the stacked body includes a first discharge hole penetrating through the stacked body in the stacking direction, cooling water flowing through the first discharge hole from the stacked body to the end member,
   the end member includes:
      a second discharge hole penetrating through the stacked body in the stacking direction, communicating with the first discharge hole, and discharging the cooling water discharged from the first discharge hole to an outside of the end member;
      a circulation flow path portion including an inlet and an outlet that open on an inner wall surface of the second discharge hole, and the circulation flow path portion circulating a part of the cooling water flowing through the second discharge hole in the end member;
      a constriction portion protruding toward the inlet from a side, facing the inlet in a direction perpendicular to the stacking direction, of the inner wall surface of the second discharge hole, and the constriction portion reducing a sectional area of the second discharge hole; and
      a cover portion formed on a side of the inner wall surface of the second discharge hole on which the outlet opens, the cover portion formed on an upstream side of the second discharge hole with respect to the outlet, and the cover portion partially covering the second discharge hole.

2. The fuel cell stack of claim 1, wherein the end member includes a cutout portion formed to enlarge a part, on the upstream side of the second discharge hole, of an opening edge of the inlet of the circulation flow path portion.

3. The fuel cell stack of claim 1, wherein
   the end member includes a protruding portion formed on a side of the inner wall surface of the second discharge hole on which the inlet opens,
   the protruding portion is formed on the upstream side of the second discharge hole with respect to the inlet, and
   the protruding portion protrudes toward the constriction portion.

4. The fuel cell stack of claim 1, wherein the constriction portion is formed into an inclined shape inclined to come close to the inlet from the upstream side to a downstream side of the second discharge hole.

5. The fuel cell stack of claim 1, wherein the end member includes:
   a terminal plate stacked on the end side of the stacked body in the stacking direction;
   an insulator stacked on a side of the terminal plate opposite to the stacked body; and
   an end plate stacked on a side of the insulator opposite to the terminal plate.

6. The fuel cell stack of claim 5, wherein the constriction portion is formed at least in the end plate.

7. The fuel cell stack of claim 5, wherein the constriction portion is formed at least in the terminal plate.

8. The fuel cell stack of claim 5, wherein the cover portion is formed at least in the terminal plate.

* * * * *